(12) United States Patent
San Filippo et al.

(10) Patent No.: US 10,549,444 B2
(45) Date of Patent: Feb. 4, 2020

(54) PROTECTIVE COVER INCLUDING PATTERNED BACKINGS

(71) Applicant: Dicar, Inc., Pine Brook, NJ (US)

(72) Inventors: Steven Anthony San Filippo, New Providence, NJ (US); Stephen Kenneth Warll, New York, NY (US)

(73) Assignee: DICAR, INC., Pine Brook, NJ (US)

( * ) Notice: Subject to any disclaimer, the term of this patent is extended or adjusted under 35 U.S.C. 154(b) by 0 days.

(21) Appl. No.: 15/349,634

(22) PCT Filed: May 13, 2015

(86) PCT No.: PCT/US2015/030512
§ 371 (c)(1),
(2) Date: Nov. 11, 2016

(87) PCT Pub. No.: WO2015/175626
PCT Pub. Date: Nov. 19, 2015

(65) Prior Publication Data
US 2018/0207829 A1 Jul. 26, 2018

Related U.S. Application Data

(60) Provisional application No. 61/996,777, filed on May 14, 2014, provisional application No. 62/030,382, filed on Jul. 29, 2014.

(51) Int. Cl.
*B26D 7/20* (2006.01)
*B26F 1/44* (2006.01)
(Continued)

(52) U.S. Cl.
CPC ............... *B26D 7/204* (2013.01); *B26F 1/44* (2013.01); *B29C 70/228* (2013.01); *B29C 70/36* (2013.01);
(Continued)

(58) Field of Classification Search
CPC .... B26D 7/204; B26F 1/44; B26F 2001/4436; B26F 2001/4445; B29C 70/228;
(Continued)

(56) References Cited

U.S. PATENT DOCUMENTS 4,800,114 A 1/1989 Cichanowski
4,883,700 A 11/1989 Harpell et al.
(Continued)

FOREIGN PATENT DOCUMENTS

| CN | 1549728 | 11/2004 |
| CN | 102725130 | 10/2012 |
| CN | 1832831 | 9/2016 |

OTHER PUBLICATIONS

Extended European Search Report for Application No. EP 15793342, dated Nov. 21, 2017, 7 pages.
(Continued)

*Primary Examiner* — Omar Flores Sanchez
(74) *Attorney, Agent, or Firm* — Lowenstein Sandler LLP

(57) ABSTRACT

A protective cover includes a padding layer and at least one backing layer comprising a network of fiber-reinforced plastic (FRP) threads, wherein a surface of the at least one backing layer is substantially rectangular comprising a first side, and wherein a plurality of the FRP threads are arranged along a direction that is oblique relative to the first side.

20 Claims, 10 Drawing Sheets

(51) Int. Cl.
*B29C 70/22* (2006.01)
*B29C 70/36* (2006.01)
*B32B 1/08* (2006.01)
*B32B 3/04* (2006.01)
*B32B 5/02* (2006.01)
*B32B 5/12* (2006.01)
*B32B 5/26* (2006.01)
*B32B 27/12* (2006.01)
*B32B 27/40* (2006.01)
*B32B 37/24* (2006.01)
*B29K 75/00* (2006.01)
*B29K 309/08* (2006.01)
*B29L 31/00* (2006.01)

(52) U.S. Cl.
CPC ............... *B32B 1/08* (2013.01); *B32B 3/04* (2013.01); *B32B 5/024* (2013.01); *B32B 5/026* (2013.01); *B32B 5/12* (2013.01); *B32B 5/26* (2013.01); *B32B 27/12* (2013.01); *B32B 27/40* (2013.01); *B32B 37/24* (2013.01); *B26F 2001/4436* (2013.01); *B26F 2001/4445* (2013.01); *B29K 2075/00* (2013.01); *B29K 2309/08* (2013.01); *B29K 2995/0082* (2013.01); *B29L 2031/72* (2013.01); *B32B 2260/021* (2013.01); *B32B 2260/046* (2013.01); *B32B 2262/101* (2013.01); *B32B 2305/07* (2013.01); *B32B 2305/182* (2013.01); *B32B 2305/186* (2013.01); *B32B 2305/188* (2013.01); *B32B 2307/536* (2013.01); *B32B 2307/54* (2013.01); *B32B 2307/544* (2013.01); *B32B 2307/546* (2013.01); *B32B 2307/732* (2013.01); *B32B 2315/085* (2013.01); *B32B 2375/00* (2013.01); *B32B 2571/00* (2013.01)

(58) Field of Classification Search
CPC .. B29C 70/36; B32B 1/08; B32B 3/04; B32B 5/02; B32B 5/024; B32B 5/026; B32B 5/12; B32B 5/26; B32B 7/02; B32B 27/12; B32B 27/40; B32B 37/24; B32B 2260/021; B32B 2260/046; B32B 2262/101; B32B 2307/536; B32B 2307/54; B32B 2307/544; B32B 2307/546; B32B 2307/732; B32B 2375/00; B32B 2315/085; B32B 2571/00; B29K 2075/00; B29K 2309/08; B29K 2995/0082; B29L 2031/72
See application file for complete search history.

(56) References Cited

U.S. PATENT DOCUMENTS

| | | | |
|---|---|---|---|
| 5,176,074 A | 1/1993 | Hartmann | |
| 5,916,346 A | 6/1999 | Neal | |
| 6,135,002 A * | 10/2000 | Neal | B26D 7/20 492/40 |
| 6,435,069 B1 | 8/2002 | Kirkpatrick, Jr. et al. | |
| 6,629,482 B2 * | 10/2003 | Elia | B26D 7/20 83/347 |
| 6,668,694 B2 | 12/2003 | Neal et al. | |
| 6,746,741 B2 | 6/2004 | Wheatley | |
| 6,889,587 B2 | 5/2005 | Neal | |
| 2002/0088328 A1 * | 7/2002 | Porcella | B26D 7/20 83/659 |
| 2002/0189419 A1 * | 12/2002 | Elia | B26D 7/20 83/698.42 |
| 2003/0041714 A1 * | 3/2003 | Neal | B26D 7/20 83/347 |
| 2012/0295057 A1 | 11/2012 | Atorrasagasti | |

OTHER PUBLICATIONS

PCT, International Search Report and Written Opinion of the International Searching Authority for PCT/US15/30512, dated Aug. 12, 2015, 11 pages.
Chinese Office Action for Chinese Application No. 2015800250527, dated Apr. 4, 2018, 2 pages.
Chinese Office Action for Chinese Application No. 2015800250527, dated Dec. 3, 2018, 2 pages.

* cited by examiner

600

PROVIDE A FIRST BACKING LAYER, IN WHICH THE FIRST BACKING LAYER COMPRISES A FIRST NETWORK OF FIBER-REINFORCED PLASTIC (FRP) THREADS 602

PROVIDE A SECOND BACKING LAYER, IN WHICH THE SECOND BACKING LAYER COMPRISES A SECOND NETWORK OF FRP THREADS ARRANGED AT AN OBLIQUE ANGLE TO THE FIRST SET OF FRP THREADS 604

BONDING THE FIRST BACKING LAYER AND THE SECOND BACKING LAYER TO A PADDING LAYER 606

*FIG. 6*

PROTECTIVE COVER INCLUDING PATTERNED BACKINGS

RELATED APPLICATIONS

This application claims the benefit of PCT Patent Application No. PCT/US2015/030512 filed on May 13, 2015, which claims the benefits of U.S. Provisional Application No. 61/996,777 filed on May 14, 2014 and U.S. Provisional Application No. 62/030,382 filed on Jul. 29, 2014, the contents of which are hereby incorporated by reference in their entirety.

TECHNICAL FIELD

This disclosure relates to a protective cover used to protect the surface of a support platform, in particular, to an anvil cover including patterned backings to prevent the anvil cover from curling and twisting during die cutting.

BACKGROUND

A die cutter, either flat or rotary, may cut work pieces such as, for example, sheets of boards on a platform (e.g., a drum or a flatbed) according to certain pre-determined shapes. The work pieces can be sheets of boards made of corrugated paper, plastic, or other materials. For example, a rotary die cutter may include a first rotatable cylinder on which cutting blades are installed, and a second rotatable cylinder to provide a support platform to support the board that is being cut. The first cylinder is commonly referred to as a die cylinder and the second cylinder is commonly referred to as an anvil cylinder, wherein the die cylinder and the anvil cylinder may be arranged such that the die cylinder is positioned above or below the anvil cylinder. A spatial gap may exist between a lowest contour line of the die cylinder and a highest contour line of the anvil cylinder. One or more motors through gears may drive the die cylinder and anvil cylinder to rotate and to enable a sheet of board to feed through the gap between the die cylinder and the anvil cylinder in response to the rotational motion and the frictional force on the surface of the anvil cylinder. The blades installed on the die cylinder may be programmed to cut the board into pre-determined shapes via the rotational motion of the die cylinder.

Both the die cylinder and the anvil cylinder may be made from hard materials such as steel. During a cutting process, the blades installed on the die cylinder need to cut through the board. To prevent the blades from hitting the hard surface of the anvil cylinder, causing damage to the blades, and to protect the surface of the anvil cylinder from scratches, anvil covers may be mounted on the anvil cylinder to provide a buffer layer between the blade tips and the anvil cylinder. In operation, the blades may make contact with and cut into the soft anvil covers, rather than contacting the hard surface of the anvil cylinder.

BRIEF DESCRIPTION OF THE DRAWINGS

The present disclosure is illustrated by way of example, and not by way of limitation, in the figures of the accompanying drawings.

FIG. 6 illustrates a method to construct an anvil cover having two backing layers according to an embodiment of the present disclosure.

DETAILED DESCRIPTION

Figure 1:
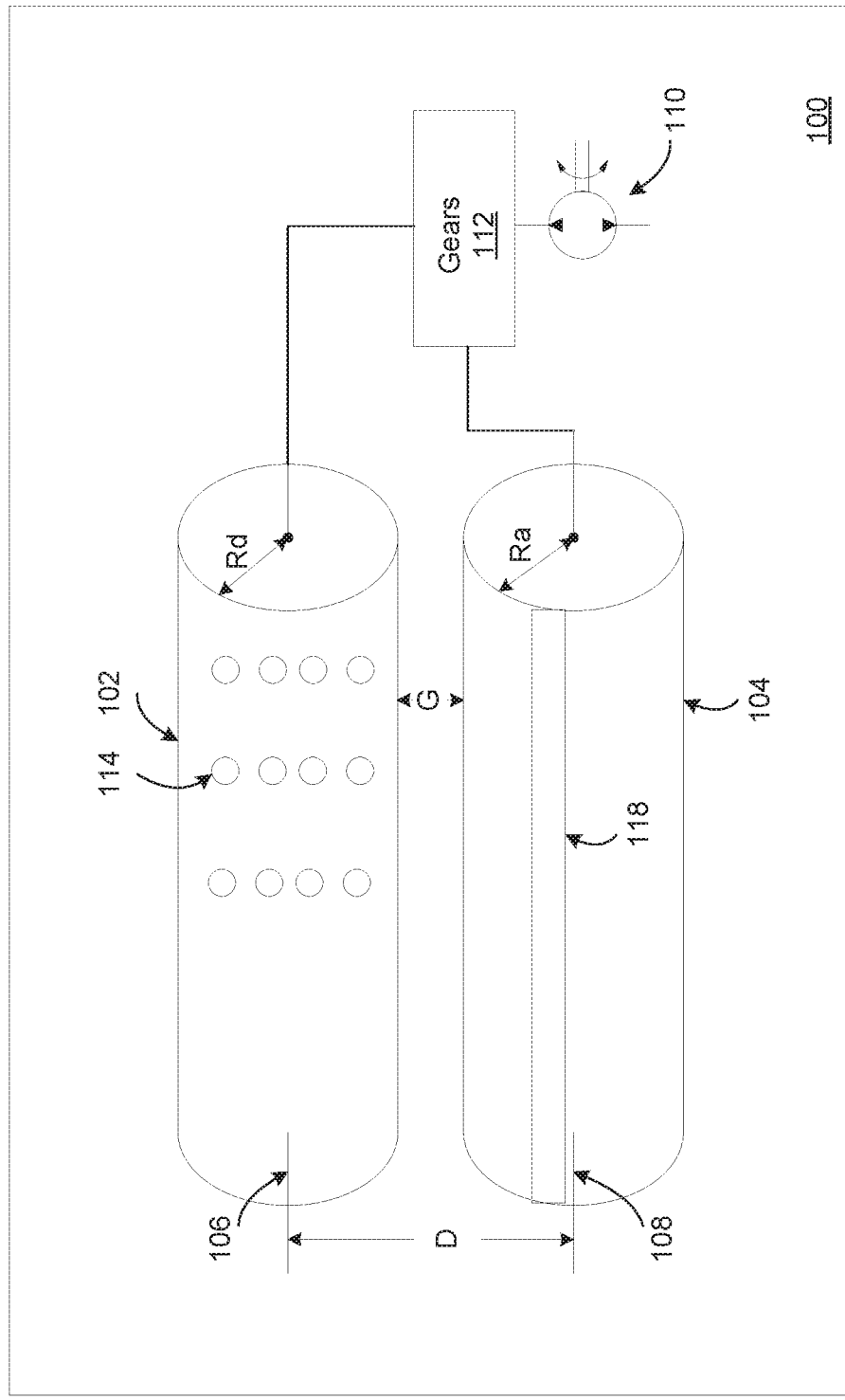
FIG. 1 illustrates a die cutter machine according to an embodiment of the present disclosure.

An anvil cover may be constructed to include a first layer composed of padding materials (herein referred to as a "padding layer") and a second layer composed of reinforcement materials (herein referred to as a "backing layer"). The padding layer may provide a layer of soft material while the backing layer may provide structural support to the padding layer. In one embodiment, the backing layer is bonded onto the padding layer. For example, the backing layer may be bonded to the padding layer during the process to form the padding layer. When the backing layer is bonded to the padding layer, the padding layer and the backing layer form an integral part of the anvil cover.

Multiple anvil covers may be combined and installed on an anvil cylinder to protect the whole surface of the anvil cylinder. When installed on the anvil cylinder, an outer surface of the padding layer of an anvil cover may face the direction of the board being cut, and come into contact with the board and the blades to absorb the force exerted by the blades installed on the die cylinder. An outer surface of the backing layer may face the anvil cylinder and come into contact with the anvil cylinder. The backing layer may help preserve the shape of the anvil cover through the cutting process.

The padding layer of an anvil cover is commonly made of suitable soft materials such as, for example, Urethane. The backing layer is the spine of the anvil cover and is typically made from a sheet of steel. In some embodiments, fabrics made of fiber-reinforced plastic (FRP) threads have been used to construct the backing layer. The FRP may be a composite material made of a polymer matrix reinforced with fibers. The fibers may be any one or a combination of glass fiber, carbon fiber, aramid fiber, basalt fiber, or any suitable type of fiber. The polymer can be an epoxy, vinylester, or polyester thermosetting plastic.

The backing layer may provide the padding layer with stability and maintain a consistent fit while being installed on the anvil cylinder through the cutting process. Without the backing layer, the Urethane material may be significantly impacted by shrinkage and swelling caused by the cutting process.

Compared to a steel backing, FRP backings are user-friendly because FRP materials (such as fiberglass) are lighter, more flexible, and easier to handle. A FRP backing layer, however, is typically constructed using FRP strands woven or knitted together according to a pattern of rectangular thread grids. In woven fabric, multiple yarns of FRP threads interface each other at right angles, thus producing the network of rectangle thread grids. In knit fabric, one continuous yarn of a FRP thread or strand is looped repeatedly to create what likes tiny rows of braids. The woven fabric may have an uneven surface, while the knitted fabric may have a substantially even surface.

An anvil cover is commonly a sheet of rectangular shape with a length, a width, and a thickness. The longitudinal side of the anvil cover is substantially parallel to an axial direction which is commonly also the direction of the anvil cylinder rotation or the direction to apply blades. The backing layer having rectangular thread grids is designed to maintain the integrity along the longitudinal direction of the anvil cover. To a lesser degree the width of the anvil cover is also stabilized. An anvil cover including a backing layer composed of a network of FRP threads woven in a pattern of rectangular thread grids, however, is easy to curl or twist when subject to the force of the cutting, thereby resulting in premature wears and shortened useful life. Therefore, there is a need for anvil covers that are flexible and resistant to curling and twisting.

Embodiments of the present disclosure relate to a protective cover including a padding layer and at least one backing layer comprising a network of fiber-reinforced plastic (FRP) threads, in which a surface of the at least one backing layer is substantially rectangular comprising a first side, and in which a plurality of the FRP threads are arranged along a direction that is oblique relative to the first side.

Embodiments of the present disclosure relate to a protective cover including a padding layer, a first backing layer comprising a first network of fiber-reinforced plastic (FRP) threads, and a second backing layer comprising a second network of FRP threads, wherein at least one FRP thread having a thread direction that obliquely intersects with a thread direction of at least one FRP thread of the second network.

Embodiments of the present disclosure relate to a method including providing a backing layer, wherein the first backing layer comprises a first network of fiber-reinforced plastic (FRP) threads, providing a second backing layer, wherein the second backing layer comprises a second network of FRP threads, and wherein at least one FRP thread of the first network obliquely intersects with at least one FRP thread of the second network, and bonding the first backing layer and the second backing layer to a padding layer.

Embodiments of the present disclosure may include anvil covers that incorporate one or more backing layers. The one or more backing layers may include networks of FRP threads in which at least one of the FRP thread intersects a side of the anvil cover at an oblique angle. The anvil covers according to the embodiments may continue to provide the benefit of the user-friendly aspect of FRP (such as fiberglass) fabric. In addition, the anvil covers according to some embodiments may provide the benefit of prolonged integrity of the anvil covers on a multi-access basis, meaning that the backing layer is to provide significantly better resistance to distortion in all directions including twisting and curling.

FIG. 1 illustrates a die cutter machine 100 according to an embodiment of the present disclosure. As shown in FIG. 1, the die cutter 100 may include a die cylinder 102 and an anvil cylinder 104. The die cylinder 102 may include mounting points 114 for installing cutting blades, and the anvil cylinder 104 may include receptors 118 (such as a lock channel) for mounting anvil covers. The die cylinder 102 and the anvil cylinder 104 may be made of suitable materials such as steel.

The curved outer surfaces of the die cylinder 102 and the anvil cylinder 104 may be considered to have been formed as the trace of a line parallel with an axis and rotating with respect to the axis. Thus, each of the die cylinder 102 and the anvil cylinder 104 may include a respective axis 106, 108 that passes through the respective center of the cylinders 102, 104 and the mass of the die cylinder 102 and the anvil cylinder 104 may rotate with respect to axis 106, 108, respectively. In an embodiment, the axes 106, 108 of the die cylinder 102 and the anvil cylinder 104 are substantially parallel to each other, and are also substantially parallel to the ground so that the die cylinder 102 and the anvil cylinder 104 are in substantially horizontal positions. The gap between the die cylinder 102 and the anvil cylinder 104 may be represented by G.

The die cylinder 102 and anvil cylinder 104 of the die cutter 100 may be driven by one or more motors 110 through one or more gears 112 configured to rotate in opposite rotational directions. For example, if the die cylinder 102 is driven to rotate counter-clockwise, the anvil cylinder 104 is driven to rotate clockwise. The opposite rotational motions between the die cylinder 102 and the anvil cylinder 104 feed the work piece (e.g., a board) to be cut horizontally through the gap (G) between the die cylinder 102 and anvil cylinder 104.

In an embodiment, the die cylinder 102 may include multiple mounting points 114 at which cutting components (e.g., blades of knives) may be installed. In an embodiment, the anvil cylinder 104 may include one or more receptors 118 (such as lock channels) for receiving locking members of an anvil cover. The receptors 118 may receive a male locking member at a first end of the anvil cover and a female locking member at a second end of the anvil cover section to couple the male and female locking members in the receptors 118. The anvil cover is securely attached to the anvil cylinder when the male locking member and female locking member are coupled inside the receptor 118. One or more anvil covers may be installed along the full width of the anvil cylinder 104 to fully cover the anvil cylinder 104 and prevent the blades installed on the die cylinder 102 from directly contacting the surface of the anvil cylinder 104.

Figure 2A:
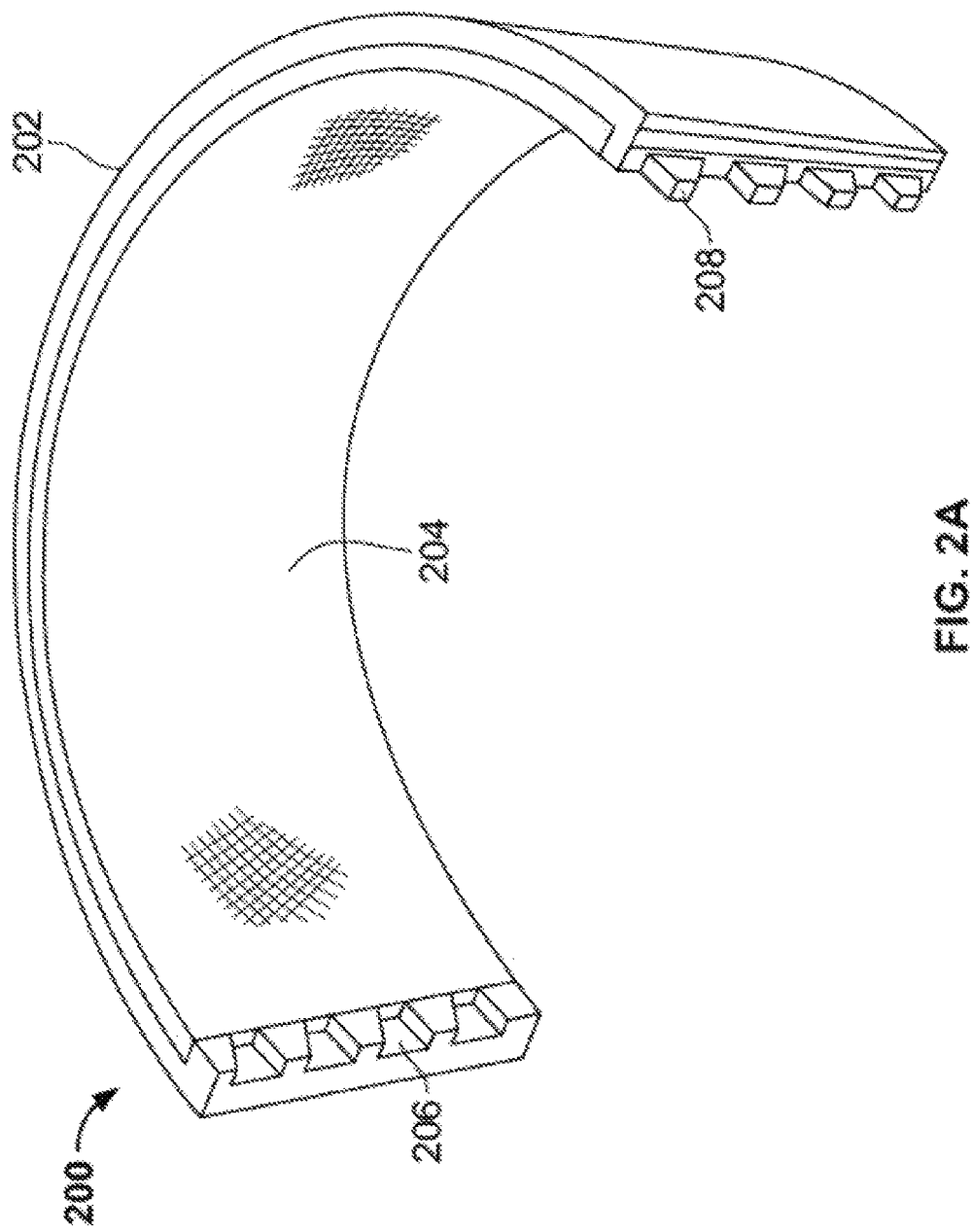
FIGS. 2A-2D illustrate various views of an anvil cover 200 according to some embodiments of the present disclosure.

FIGS. 2A-2D illustrate various views of an anvil cover 200 according to some embodiments of the present disclosure. FIG. 2A shows a perspective view of the anvil cover according to an embodiment of the present disclosure.

As shown in FIG. 2A, the anvil cover 200 may include a padding layer 202 and a backing layer 204. The anvil cover 200 may further include female lock members 206 and male lock members 208 for securing the anvil cover 200 onto lock channels of an anvil cylinder. The padding layer 202 may be made of any suitable material such as, for example, Urethane. The backing layer 104 may be a piece of fabric made of any suitable material such as, for example, FRP threads. For the convenience of discussion, the backing layer 204 is referred to as made of fiberglass threads. However, a person of ordinary skill in the art would appreciate that the backing layer can be any suitable material that provides support to the padding layer 202. For example, the padding layer 202 may be composed of a network of FRP threads. Further, the padding layer 202 and backing layer 204 are flexible, allowing the anvil cover 200 to be bent to conform with an outer contour of the anvil cylinder 104. For example, as shown in FIG. 2A, anvil cover 200 may be bent into half cylinder walls and installed on an anvil cylinder to cover half of a strip of the anvil cylinder. As shown in FIG. 2D, two anvil covers 200 may be interconnected and installed on the anvil cylinder 104 to form a cylindrical wall that may be used to cover a full strip of the anvil cylinder 104.

The padding layer 202 may include a first surface facing the direction of a die cutter and a second surface bonded to the backing layer 204. The backing layer 204 may include a first surface facing the direction of a support platform (e.g., the anvil cylinder in a rotary die cutter) and a second surface that is bonded to the second surface of the padding layer 202.

The padding layer 202 and the backing layer 204 may be bonded together by any suitable method.

Figure 2B:
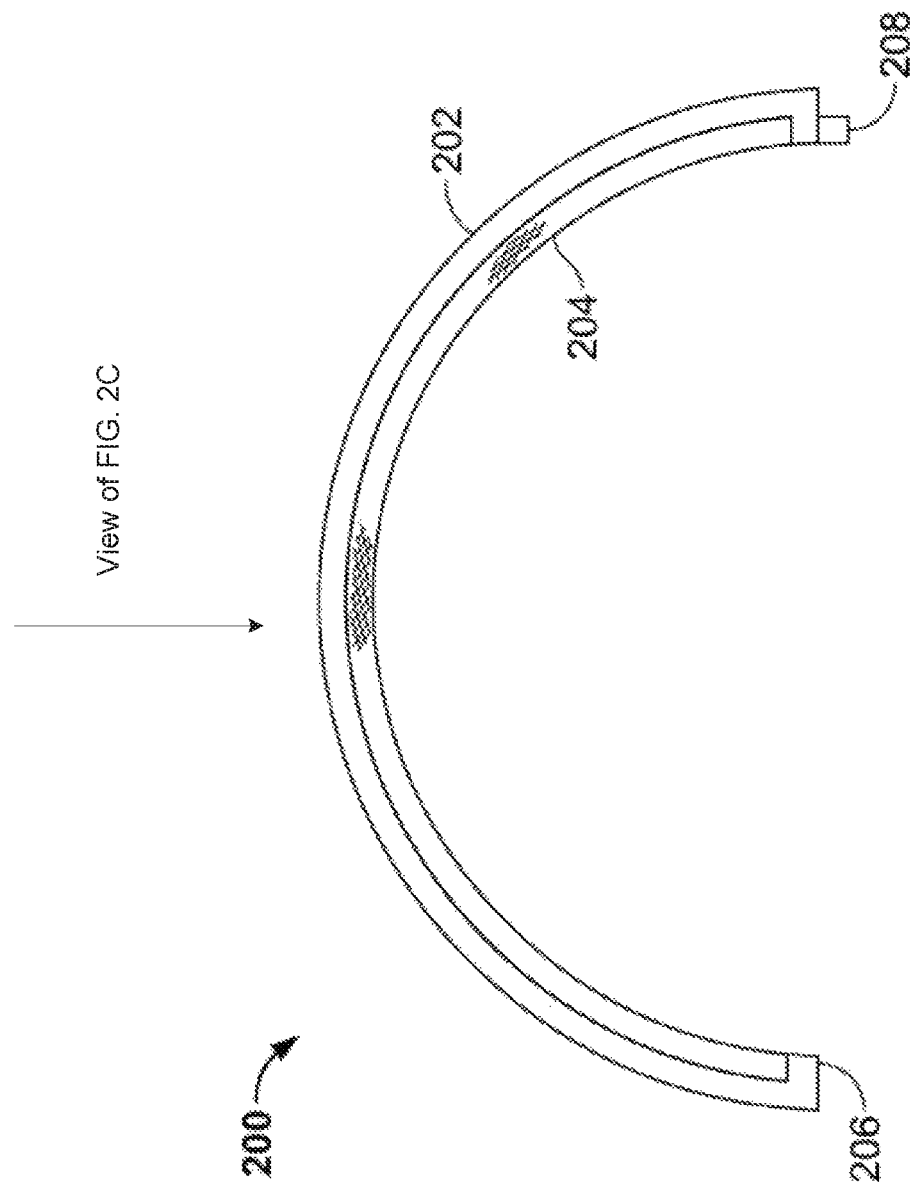

FIG. 2B shows a cross-section view of the anvil cover 200 as shown in FIG. 2A according to an embodiment of the present disclosure. As shown in FIG. 2B, the anvil cover 200 may have a layered construction including the padding layer 202 bonded to the backing layer 204. The anvil cover 200 may further include female locking members 206 and male locking members 208 for securing the anvil cover 200 onto an anvil cylinder.

Figure 2C:
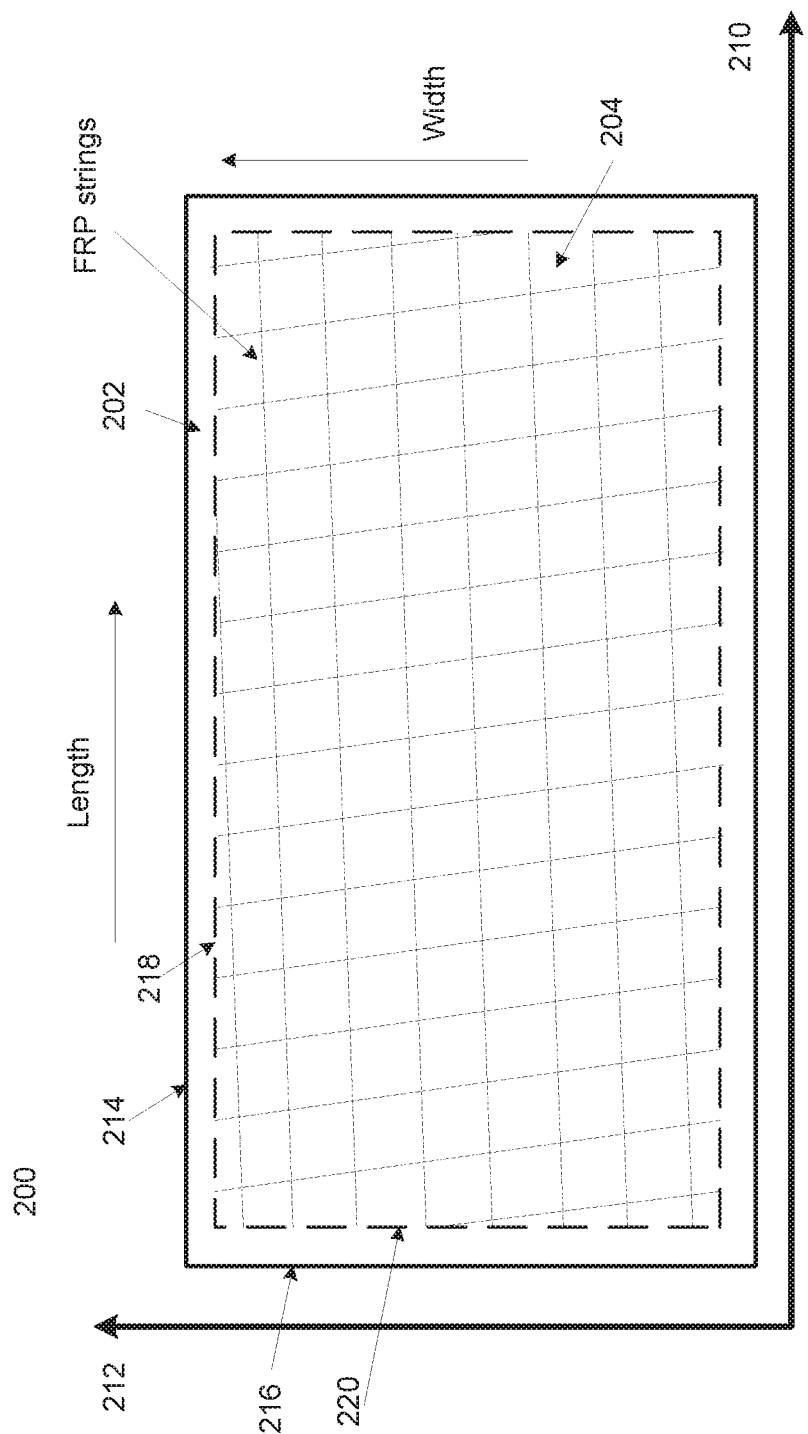
Figure 2D:
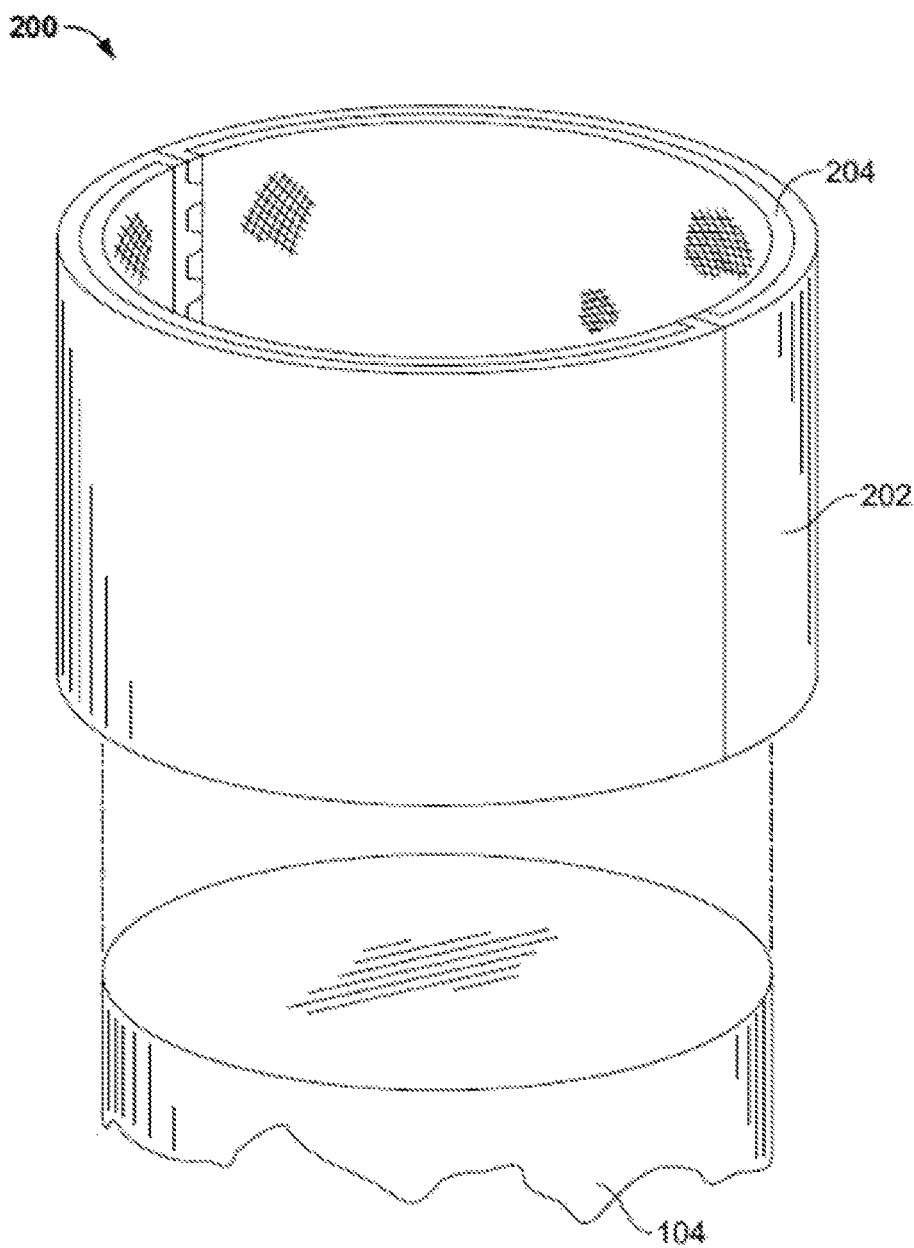

FIG. 2C shows a top view of the anvil cover 200 as shown in FIGS. 2A, 2B according to an embodiment of the present disclosure. As shown in FIG. 2B, the top view of FIG. 2C is viewed towards the first surface of the padding layer 202 of the anvil cover 200. As shown in FIG. 2C, when viewed towards the first surface of the padding layer 202, the anvil cover may have a substantially rectangular shape that may include a first side 214 (e.g., the length edge) along a first axis 210 and a second side 216 (e.g., the width edge) along axis 212. In one embodiment, the anvil cover 200 may be wrapped around an anvil cylinder along the direction of the first side 214 (i.e., the first side of the anvil cover along the circular contour of the anvil cylinder). Thus, when installed on the anvil cylinder, the anvil cover 200 may rotate with the anvil cylinder along the direction of the first side 214 with respect to the axis 108 as shown in FIG. 1. Further, during operation of the die cutter 100, blades installed on the die cylinder 106 may exert cutting force to a work piece while the anvil cylinder rotates. The cutting force as applied to the work piece and the anvil cover 200 may generate a drag force along the rotating direction that may cause curling and twisting of the anvil cover 200.

The backing layer 204 may include a piece of substantially rectangular fiberglass fabric which may also have a first side 218 (length) and a second side 220 (width). In one embodiment, the first side 218 of the fiberglass fabric is substantially parallel to the first side 214 of the padding layer 202 along which the die cutter may cut sheets of materials, and the second side 220 of the fiberglass fabric is substantially parallel to the second side 216 of the padding layer 202 along which another anvil cover may be locked to form a cylinder and attach to the platform.

Figure 3:
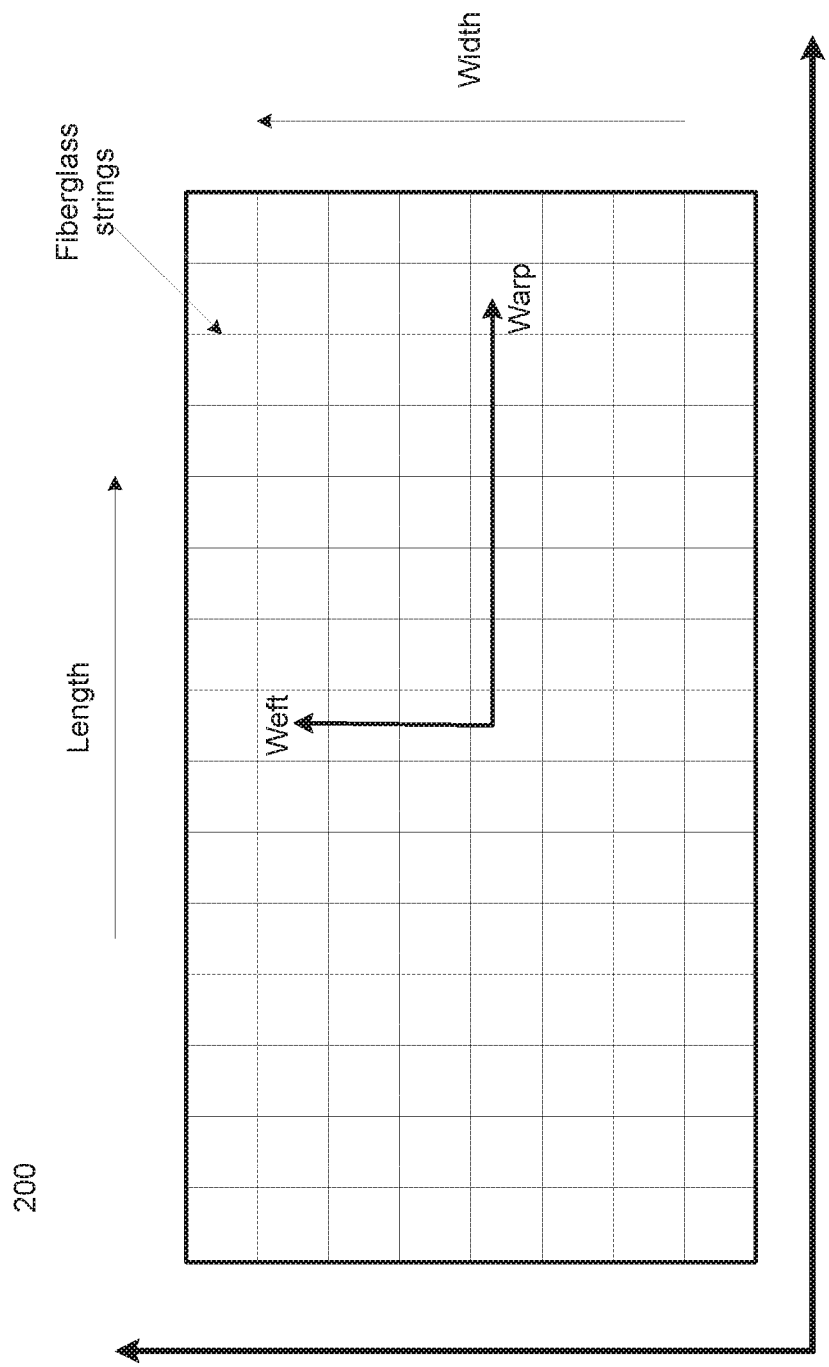
FIG. 3 illustrates a piece of fiberglass fabric including a thread pattern of rectangular thread grids.

The backing layer 204 may include a piece of fiberglass fabric made from fiberglass threads that are woven or knitted together according to a certain pattern. In some implementations, as shown in FIG. 3, the fiberglass fabric of the backing layer may include a network of fiberglass threads woven or knitted into a pattern of rectangular thread grids. In these implementations, a first set of fiberglass threads are woven or knitted along a warp direction that may be substantially parallel to the first side of the rectangular anvil cover and substantially perpendicularly intersect the second side of the anvil cover, and a second set of fiberglass threads are woven or knitted along a weft (or fill) direction that is substantially parallel to the second side of the rectangular anvil cover and substantially perpendicularly intersect the first side of the anvil cover. The warp direction is the axial direction of the fiberglass fabric, and the weft direct is traverse to the axial direction. Because of the manner that the fiberglass fabric is woven or knitted, the tensile strength of the fiberglass fabric along the warp direction may be stronger than that along the weft direction. As discussed above, a backing layer including a single layer of rectangular-patterned fiberglass threads whose warp direction and weft direction are parallel to either the first or the second side of the anvil cover is less resistant to the twisting and curling force that is applied along the axial direction of the fiberglass fabric backing layer during the cutting process. The twisting and curling of the anvil cover reduce the useful life of anvil covers.

Instead of using a backing layer containing exclusively fiberglass threads that are parallel to either side of the anvil cover, the backing layer of the anvil cover according to embodiments of the present disclosure may include fiberglass threads (e.g., the first set or the second set of fiberglass threads) that are oblique with respect either side of the anvil cover. Because of these oblique fiberglass threads in the backing layer, the force exerted by the cutting blades is not perpendicularly applied to the fiberglass threads of the backing layer. Rather, the force is applied obliquely with respect to these oblique fiberglass threads, thus reducing the pulling and stressing forces applied to these oblique fiberglass threads during the cutting processing. Because of the reduced pulling and stressing force, the useful life of the anvil cover according to embodiments of the present disclosure may be significantly prolonged.

Figure 4A:
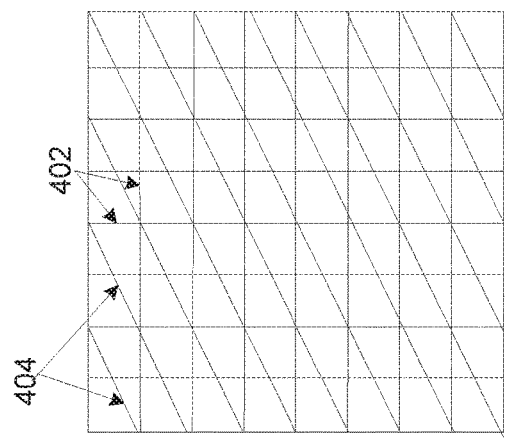
FIGS. 4A-4E illustrates thread patterns of a backing layer according to some embodiments of the present disclosure.
Figure 4B:
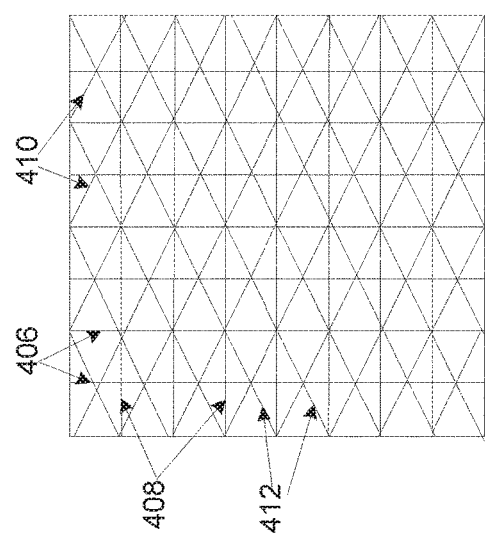

FIGS. 4A-4E illustrates thread patterns of fiberglass threads according some embodiments of the present disclosure. In one embodiment, as shown in FIG. 4A or 4B, the backing layer may include fiberglass threads that are arranged (by weaving or knitting) parallel to either side of the rectangular anvil cover and fiberglass threads that are oblique with respect to either side of the rectangular anvil cover. For example, as shown in FIG. 4A, the network of fiberglass threads are woven or knitted together, including fiberglass threads 402 that are parallel to either side of the anvil cover and fiberglass threads 404 that are woven in directions that are oblique with respect to either side of the anvil cover. As shown in FIG. 4A, the oblique fiberglass threads may be substantially parallel to each other.

In other embodiments, the oblique fiberglass threads may be woven or knitted along multiple directions. For example, as shown in FIG. 4B, the arrangement of fiberglass threads of the backing layer may include four sets of substantially parallel fiberglass threads with two sets 406, 408 parallel to the sides and two sets 410, 412 oblique with respect to the sides of the rectangular anvil cover.

Figure 4C:
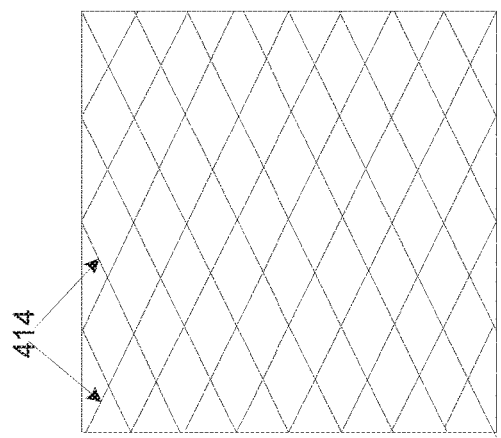

In some embodiments, the backing layer may exclusively consist of fiberglass threads that are woven in a manner that these fiberglass threads are oblique with respect to either side of the anvil cover. For example, as shown in FIG. 4C, the backing layer may contain fiberglass threads 414 that are oblique with respect to either side of the anvil cover.

Figure 4D:
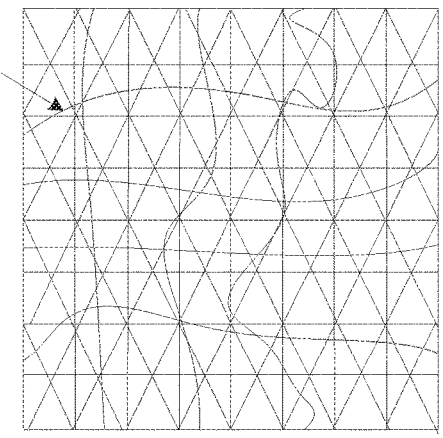

In some embodiments, the backing layer may include not only fiberglass threads that are straightened and parallel, but also fiberglass threads that are knitted into the fiberglass fabric as undulating curves intertwined with these parallel fiberglass threads. For example, the backing layer as shown in FIG. 4D includes curved fiberglass threads 406 that are knitted into the network of substantially parallel fiberglass threads. These curved fiberglass threads 416 may intertwine the parallel fiberglass threads as various angles and provide further support strength to the anvil cover.

Figure 4E:
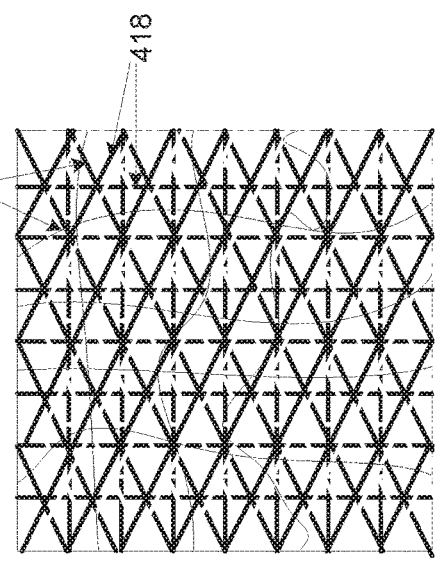

In some embodiments, the backing layer may include substantially same types of fiberglass threads. For example, the fiberglass threads may have been coated with similar chemical compounds and with substantially similar thickness. In some other embodiments, the backing layer may include various types of fiberglass threads. For example, as shown in FIG. 4E, the backing layer may include straightened and parallel fiberglass threads 418 that are thicker and curved fiberglass threads 420 that are thinner. In one embodiment, the thicker fiberglass threads may be significantly thicker than (e.g., approximately five times) the thinner fiberglass threads.

Figure 5A:
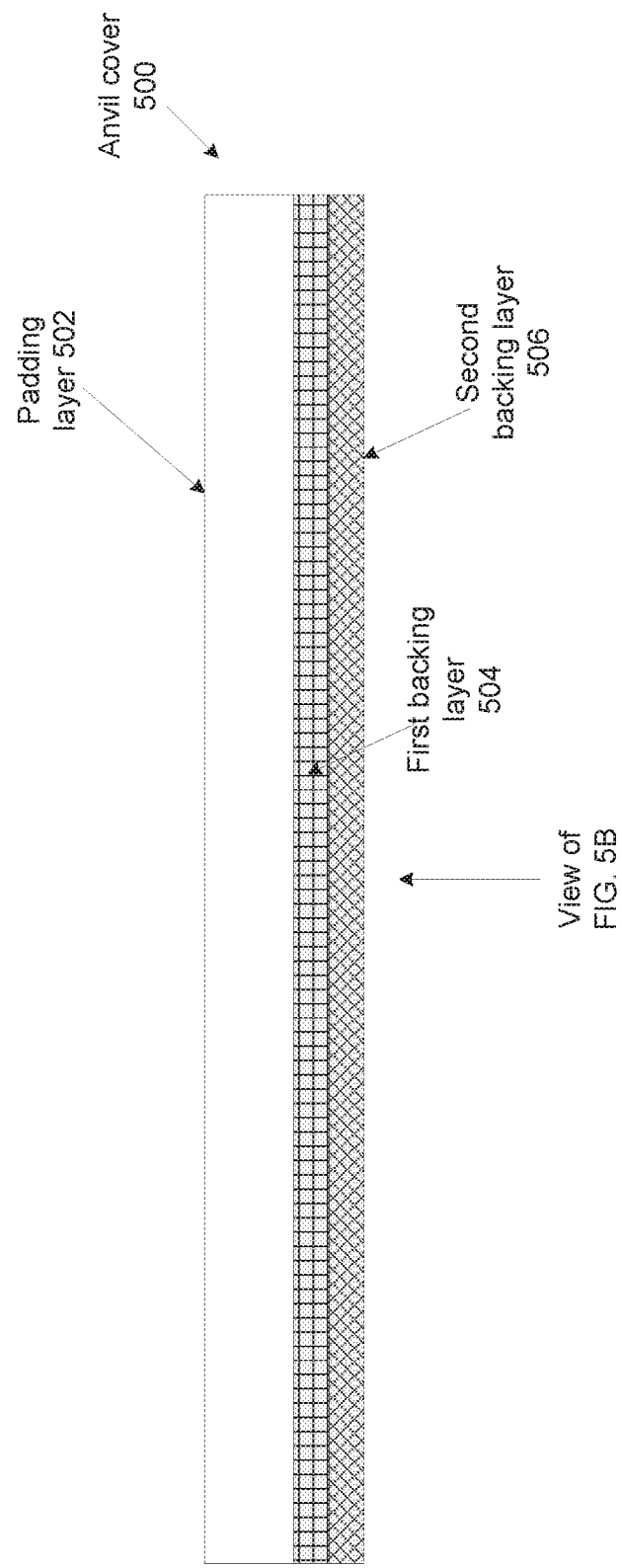
FIG. 5A shows a cross-section of an anvil cover including more than one backing layers according to some embodiments of the present disclosure.

In certain embodiments, the anvil cover may include more than one backing layers. FIG. 5A shows a cross-section of an anvil cover 500 that includes more than one backing layers according to some embodiments of the present disclosure. As shown in FIG. 5A, the anvil cover 500 may include a padding layer 502 that is similar to the padding layer 102 as shown in FIG. 1. The anvil cover 500 may further include a first backing layer 504 and a second backing layer 506. In one embodiment, both backing layers 502, 504 may be made of same type of fiberglass materials. In other embodiments, the first and second backing layers 502, 504 may be made of different types of materials. For example, the first backing layer 502 may be made of a first type of fiberglass threads, and the second backing layer 504 may be made of a different type of fiberglass threads or a different material other than fiberglass. The different materials may be a suitable type of FRP material.

In one embodiment, one of the first backing layer 504 or the second backing layer 506 may be a piece of fiberglass fabric that includes the rectangular woven patterns as shown in FIG. 3 while the other layer includes woven patterns that are at an oblique angle with respect to sides of the rectangular anvil cover. For example, the first backing layer 504 may include the rectangular thread grids as shown in FIG. 3 while the patterns of the second backing layer 506 may be at an oblique angle to the rectangular thread grids. Similarly, the second backing layer 504 may include the rectangular thread grids as shown in FIG. 3 while the patterns of the first backing layer 506 may be at an oblique angle with respect to the rectangular thread grids of FIG. 3. Thus, embodiments of the present disclosure may include an anvil cover including a first backing layer of a first pattern and a second backing layer of a second pattern, in which the second pattern is at an oblique angle from the first pattern. The oblique angles between the first and second patterns may vary within a certain range. For example, in one embodiment, the oblique angle may vary from approximately 10 degrees to approximate 80 degrees. In another embodiment, the oblique angle may vary from approximately 30 degrees to approximately 60 degrees. In one embodiment, the oblique angle may be at approximately 45 degrees.

Figure 5B:
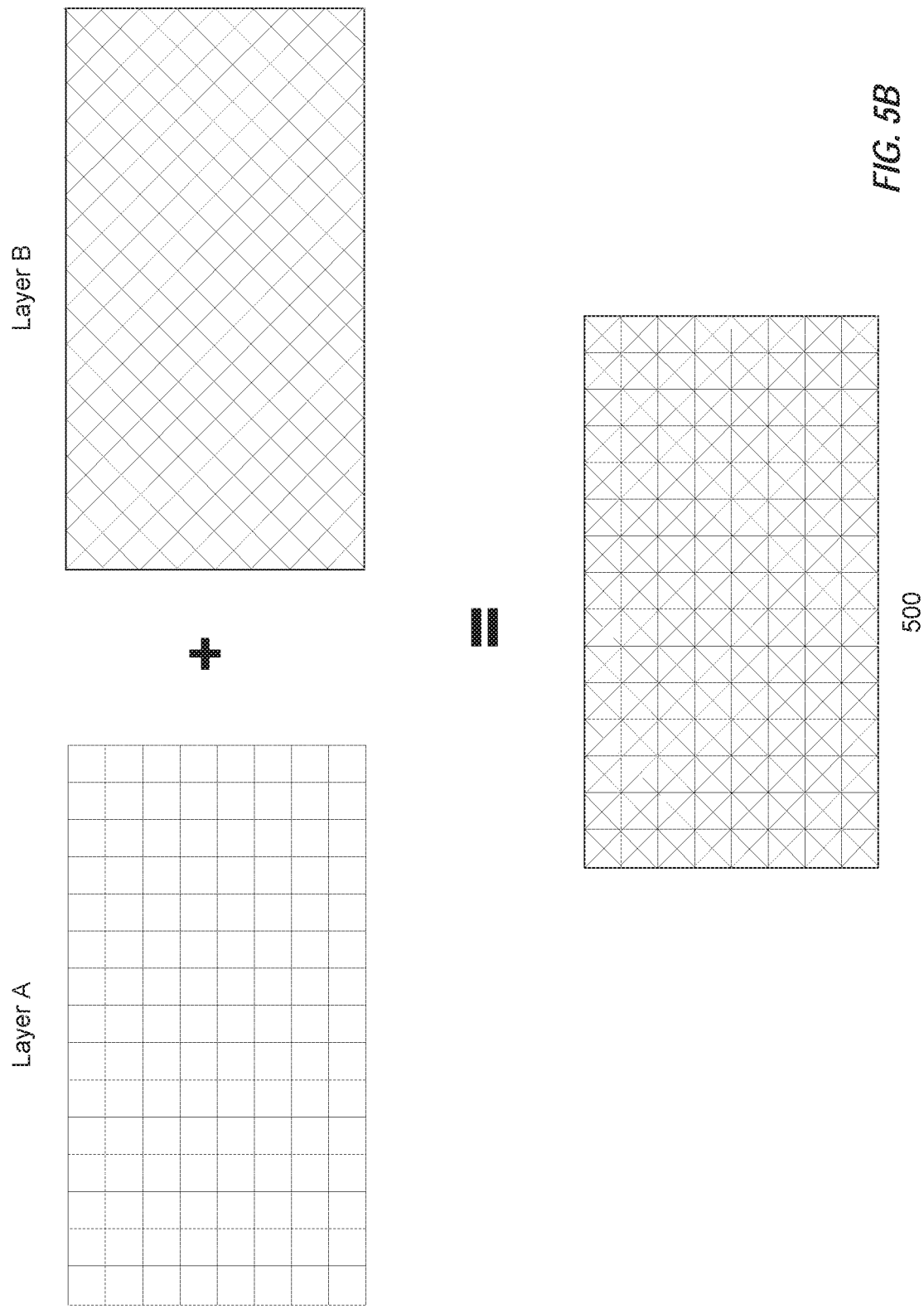
FIG. 5B illustrates a combination of two backing layers according to an embodiment of the present disclosure.

FIG. 5B illustrates a combination of two backing layers according to an embodiment of the present disclosure. As shown in FIG. 5B, a first backing layer (layer A) may include fiberglass threads woven or knitted according to the rectangular thread grids perpendicular to the sides of the rectangular fiberglass fabric, and a second backing layer (layer B) may include fiberglass thread grids that are oblique to the pattern of layer A. For this example, the second grid pattern is at approximately 45 degrees relative to the first grid pattern. In one embodiment, the first backing layer and the second backing layer may be bonded together to form a combined backing layer 500 which includes a fiberglass thread pattern having threads both perpendicular to the sides of the rectangular fiberglass fabric and at an oblique angle (45 degree) to the sides. In some embodiments, the first backing layer and the second backing layer may be bonded together during the process of forming a padding layer.

FIG. 6 illustrates a method 600 to construct an anvil cover having two backing layers according to an embodiment of the present disclosure. As shown in FIG. 6, at 602, a first backing layer may be provide, in which the first backing layer may include a first network of FRP threads. For example, the first backing layer may be a fiberglass fabric that may be laid down on a molding device. In one embodiment, the molding device may be a rectangular-shaped box in which hot, liquid Urethane fluid may be poured to form the padding layer.

At 604, a second backing layer may be provided, in which the second backing layer may include a second network of FRP threads. The second backing layer may be laid down to enable the thread grids of the second network of FRP whose thread directions are at an oblique angle relative to the first FRP threads. For example, the second backing layer may be a laid on top to the first backing layer in the same molding device.

At 606, the first and second backing layers may be bonded to a padding layer using any suitable method. For example, the bonding may occur when the padding layer is formed in the molding device by pouring hot Urethane into the molding device.

Embodiments of the present disclosure may improve the structure of the anvil cover by offering superior support to the anvil cover in the die cutting process. Specifically, the anvil cover's ability to resist cross-dimensional pressure and tension created by the die cutting process is greatly improved. As a result, embodiments significantly improve the longevity of the anvil cover by significantly reducing curling and twisting in the length and width of the anvil covers.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A protective cover for an anvil cylinder, the protective cover comprising:
   a padding layer; and at least one backing layer comprising a network of fiber-reinforced plastic (FRP) threads, wherein a surface of the at least one backing layer is substantially rectangular comprising a first side, and wherein the network of FRP threads comprises:
- a first plurality of FRP threads arranged along a first direction that is oblique relative to the first side;
- a second plurality of FRP threads arranged along a second direction; and
- a third plurality of FRP threads intertwined with the first plurality of FRP threads and the second plurality of FRP threads.

2. The protective cover of claim 1, wherein the padding layer comprises Urethane.

3. The protective cover of claim 1, wherein the network of FRP threads comprise at least one of a glass fiber, a carbon fiber, an aramid fiber, or a basalt fiber.

4. The protective cover of claim 1, wherein the network of FRP threads are at least one of woven or knitted into a piece of fabric.

5. The protective cover of claim 1, wherein the first direction is substantially perpendicular to the second direction.

6. The protective cover of claim 4, wherein the third plurality of FRP threads are intertwined with the first plurality of FRP threads and the second plurality of FRP threads along a plurality of different directions.

7. The protective cover of claim 1, wherein the first plurality of FRP threads and the second plurality of FRP threads are a same type of FRP threads, and wherein the third plurality of FRP threads are a different type of FRP threads from the first plurality of FRP threads.

8. The protective cover of claim 1, wherein a thickness of one of the first plurality of FRP threads or the second plurality of FRP threads is substantially greater than a thickness of the third plurality of FRP threads.

9. The protective cover of claim 1, wherein the at least one backing layer is bonded to the padding layer during a process to form the padding layer.

10. The protective cover of claim 1, wherein the protective cover is to be installed on an anvil cylinder of a die cutter, and wherein when installed, the at least one backing layer of the protective cover faces the anvil cylinder.

11. The protective cover of claim 10, wherein when installed on the anvil cylinder, the first side of the backing layer is substantially parallel to a rotational direction of the anvil cylinder during a cutting operation by the die cutter.

12. A protective cover for an anvil cylinder, the protective cover comprising:
- a padding layer;
- a first backing layer comprising a first network of fiber-reinforced plastic (FRP) threads comprising a first FRP thread; and
- a second backing layer comprising a second network of a FRP threads comprising a second FRP thread, wherein the first FRP thread of the first network obliquely intersects with a second FRP thread of the second network.

13. The protective cover of claim 12, wherein the padding layer comprises Urethane, and wherein the FRP comprises at least one of a glass fiber, a carbon fiber, an aramid fiber, or a basalt fiber.

14. The protective cover of claim 12, wherein both the first backing layer and the second backing layer are bonded to the padding layer.

15. The protective cover of claim 12, wherein the first network of FRP threads is at least one of woven or knitted into a first piece of fabric, wherein the first piece of fabric comprises a first plurality of FRP threads substantially along a first direction and a second plurality of FRP threads substantially along a second direction.

16. The protective cover of claim 15, wherein the second network of FRP threads is at least one of woven or knitted into a second piece of fabric, wherein the second piece of fabric comprises a third plurality of FRP threads at least one of woven or knitted substantially along a third direction and a fourth plurality of FRP threads substantially along a fourth direction, and wherein the first direction obliquely intersects one of the third direction or the fourth direction, and wherein the second direction obliquely intersects one of the third direction or the fourth direction.

17. The protective cover of claim 16, wherein the first direction is substantially perpendicular to the second direction, and wherein the third direction is substantially perpendicular to the fourth direction.

18. The protective cover of claim 12, wherein the first backing layer and the second backing layer are bonded to the padding layer during formation of the padding layer.

19. A method comprising:
- providing a first backing layer, wherein the first backing layer comprises a first network of a plurality of fiber-reinforced plastic (FRP) threads;
- providing a second backing layer, wherein the second backing layer comprises a second network of a plurality of FRP threads, and wherein a first FRP thread of the first network obliquely intersects with a second FRP thread of the second network; and
- bonding the first backing layer and the second backing layer to a padding layer to form a cover for an anvil cylinder.

20. The method of claim 19, wherein the padding layer comprises Urethane, and wherein the FRP comprises at least one of a glass fiber, a carbon fiber, an aramid fiber, or a basalt fiber.

\* \* \* \* \*